United States Patent [19]

Igashira et al.

[11] 4,362,142

[45] Dec. 7, 1982

[54] FUEL HEATING APPARATUS FOR INTERNAL COMBUSTION ENGINE

[75] Inventors: Toshihiko Igashira, Toyokawa; Hitoshi Yoshida; Ken Nomura, both of Okazaki; Seikou Abe, Kariya, all of Japan

[73] Assignee: Nippon Soken, Inc., Nishio, Japan

[21] Appl. No.: 195,505

[22] Filed: Oct. 9, 1980

[30] Foreign Application Priority Data

Nov. 30, 1979 [JP] Japan .............................. 54-155766

[51] Int. Cl.³ ............................................ F02M 31/00
[52] U.S. Cl. ................................... 123/549; 219/206; 261/142
[58] Field of Search ............... 123/549, 552; 219/206, 219/207; 261/142

[56] References Cited

U.S. PATENT DOCUMENTS

| | | | |
|---|---|---|---|
| 1,455,183 | 5/1923 | Wright | 219/206 |
| 1,472,233 | 10/1923 | Taylor | 123/549 |
| 2,700,722 | 1/1955 | Gurley | 123/549 |
| 2,719,520 | 10/1955 | Balzer et al. | 123/549 |
| 4,141,327 | 2/1979 | Marcoux | 123/549 |
| 4,303,050 | 12/1981 | Platzer | 261/142 |
| 4,308,845 | 1/1982 | Sarto | 261/142 |
| 4,313,413 | 2/1982 | Miyoshi | 261/142 |

Primary Examiner—Ronald H. Lazarus
Attorney, Agent, or Firm—Cushman, Darby & Cushman

[57] ABSTRACT

A fuel heating apparatus for an internal combustion engine has a tubular extension member extending downwardly from the bottom end of an intake pipe into a mixture distribution chamber defined in an intake manifold beneath the inlet opening thereof connected to the intake pipe. An annular electric heater element is disposed in the mixture distribution chamber in vertical alignment with the tubular extension member so that the part of fuel which flows in liquid phase on the inner peripheral surfaces of the intake pipe and the tubular extension member falls therefrom onto the annular electric heater and heated and vaporized thereby and can be easily mixed with air from the intake pipe.

8 Claims, 2 Drawing Figures

FUEL HEATING APPARATUS FOR INTERNAL COMBUSTION ENGINE

BACKGROUND OF THE INVENTION

1. Field of the Invention

The present invention relates to a fuel heating apparatus for an internal combustion engine and, more particularly, to an apparatus for heating and vaporizing the fuel which tends to flow in a liquid phase on the inner surface of the intake system of an internal combustion engine when it is at a low temperature.

2. Description of the Prior Art

The state which an internal combustion engine takes by the time the engine is sufficiently warmed up is called as "cold condition". In the cold condition, the vaporization of the fuel is not facilitated and a part of the fuel supply to the engine forms a liquid film on the inner surface of an intake manifold of the engine and flows slowly on the manifold inner surface. This adversely affects the mixture of the fuel and air, so that the air-fuel mixture produced is leaner than the air-fuel ratio which is required to assure smooth engine operation.

In order to overcome the problem discussed above, the internal combustion engine when in cold condition was supplied with the fuel in excess of the predetermined amount. The excessive fuel supply, however, disadvantageously increased the harmful components of the engine exhaust gases, such as HC, and deteriorated the fuel consumption rate of the engine.

So as to eliminate the disadvantages discussed, it has been proposed to dispose an electric heater at the bottom of the point of the intake manifold where the branches thereof diverge (this point of the intake manifold will be called as "diverging point"). Because the location of the heater has not been good, the operation of the heater to heat the air to be introduced into the engine has consumed a large amount of electric energy. The electric heater has caused a decrease in the charging effect and, in addition, has not been effective to remarkably improve the vaporization of the liquid fuel part flowing on the inner surface of the intake manifold.

SUMMARY OF THE INVENTION

It is a primary object of the present invention to facilitate the vaporization of the liquid fuel part flowing on the inner surface of the intake system of an internal combustion system thereby to eliminate the adverse effects heretofore caused by the liquid fuel flow on the inner surface of the intake system.

So as to achieve the object, the present invention provides an improved fuel heating apparatus for an internal combustion engine including an intake pipe with a throttle valve disposed therein, means upstream of throttle valve for supplying liquid fuel into the intake pipe and an intake manifold for distributing a mixture of air and the fuel to respective engine cylinders, the intake manifold defining an inlet opening connected to the bottom end of the intake pipe, the improvement which comprises a tubular extension member substantially coaxial with the intake pipe and extending through the inlet opening into the intake manifold, and a heating element disposed in the intake manifold substantially in vertical alignment with the peripheral wall of the tubular extension member and supported therefrom.

Any liquid fuel part that flows down on the inner surfaces of the intake pipe and the tubular extension member falls therefrom onto the upper surface of the heating element so that the liquid fuel is heated and evaporated by the heating element and thus can surely be mixed with the air from the intake pipe.

The above and other objects, features and advantages of the present invention will be made more apparent by the following description with reference to the accompanying drawings.

DESCRIPTION OF PREFERRED EMBODIMENTS

Figure 1:
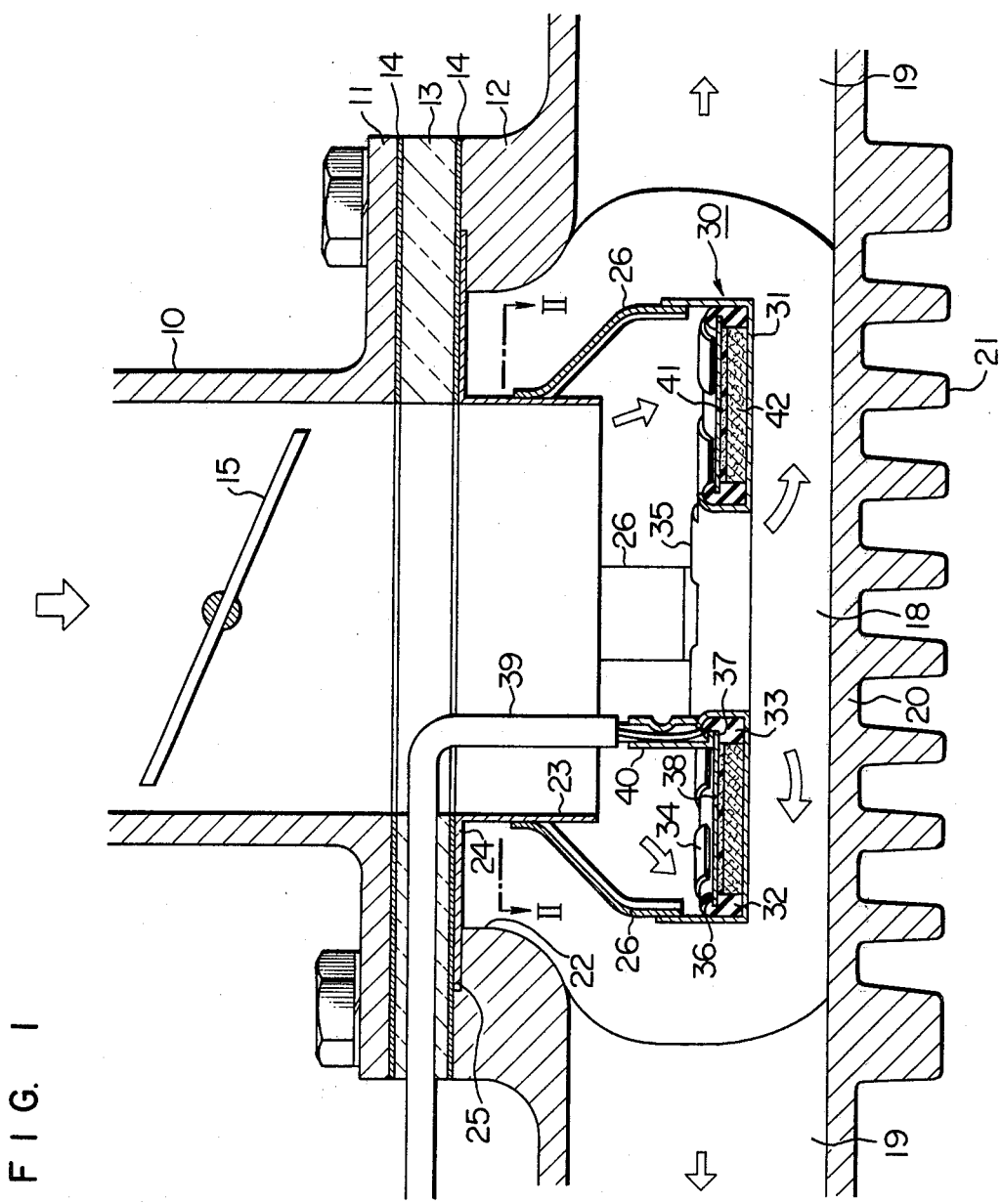
FIG. 1 is a vertical sectional view of an embodiment of a fuel heating apparatus for an internal combustion engine according to the present invention.
Figure 2:
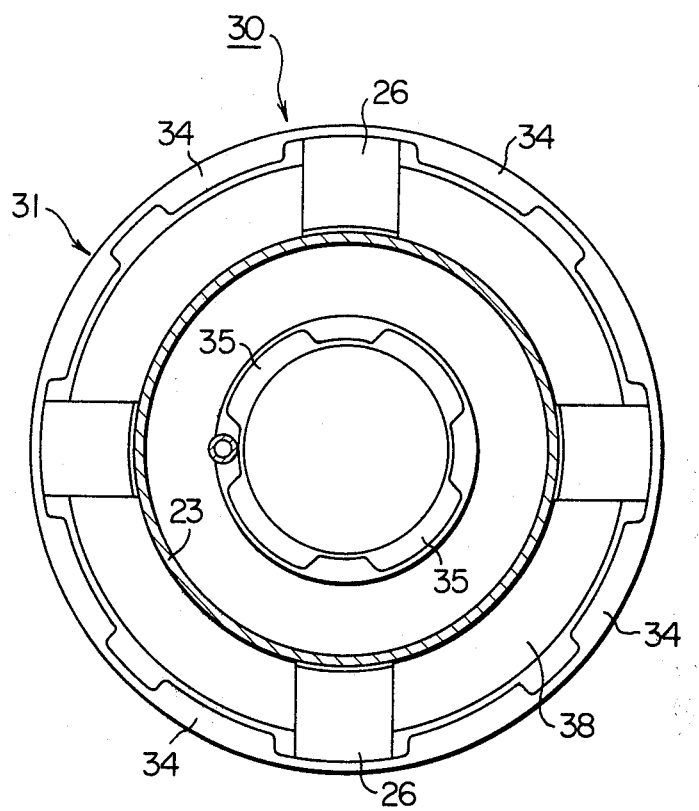
FIG. 2 is a cross-sectional view of the fuel heating apparatus taken on line II—II in FIG. 1.

Referring to the drawings and, more particularly, to FIGS. 1 and 2, an intake pipe 10 of an intake system of an internal combustion engine (not shown) has a flanged bottom end 11 which is secured by bolts to the part of an intake manifold 12 which defines an inlet opening 22. A layer 13 of a heat insulating material and two layers 14 of gasket material are sandwiched between the intake pipe 10 and the intake manifold 12.

Figure 3:
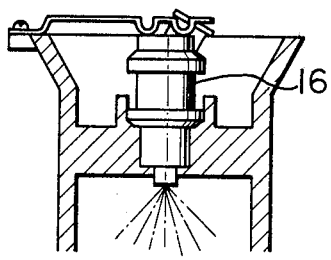
FIGS. 3 and 4 are simplified diagrammatic sectional views of examples of fuel supply means to be installed in the intake system into which the apparatus according to the present invention is incorporated.
Figure 4:
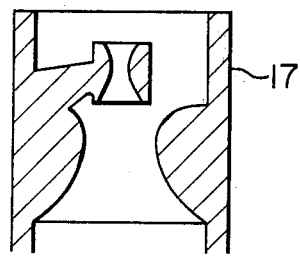

Within the intake pipe 10, a throttle valve 15 of butterfly type is provided in conventional manner. A conventional fuel supply means, which may be either an electromagnetic fuel injector 16 shown in FIG. 3 or a carburetor 17 shown in FIG. 4, is provided in the intake system upstream of the throttle valve 15. The fuel supply means, however, is not a part of the present invention and thus will not be discussed in more detail herein.

The intake manifold 12 includes a plurality of branches 19 leading to engine cylinders (not shown). The part of the intake manifold 12 immediately below the inlet opening 22 defines a distribution chamber 18 which is communicated with the downstream end of the intake pipe 10 so that the mixture of air and fuel flowing from the intake pipe 10 into the distribution chamber 18 is distributed therefrom through respective manifold branches 19 to respective engine cylinders. In the illustrated embodiment of the invention, a plurality of fins 21 are provided on the outer surface of the bottom 20 of the intake manifold 12 and adapted to be in heat exchange relationship with the engine exhaust gases so that the bottom 20 of the intake manifold is heated by the exhaust gases.

The inlet opening 22 of the intake manifold 12 is greater in diameter than the intake pipe 10. A tubular extension 23 having an inner diameter substantially the same as that of the intake pipe 10 is disposed in the inlet opening 22 coaxially with the intake pipe 10 and extends from the inlet opening 22 into the upper part of the distribution chamber 18. The upper end of the tubular extension 23 is connected with a radially outwardly extending annular flange 24 which is received between and clamped by the top surface of the intake manifold 12 and one of the gasket elements 14. The top surface of the intake manifold 12 around the inlet opening 22 is formed with an annular recess 25 of a diameter the same as that of the flange 24 so that the top surface of the intake manifold 12 is flush with the upper surface of the flange 24.

Four circumferentially spaced stays 26 are welded at their upper ends to the outer peripheral surface of the tubular extension 23 and support an annular heating element 30 from the tubular extension 23. The heating element 30 is disposed in the distribution chamber 18 at a distance downwardly from the bottom end of the tubular extension 23.

The annular heating element 30 is substantially coaxial with the tubular extension 23 and has an outer diameter greater than the outer diameter of the extension tube 23 and an inner diameter smaller than the inner diameter of the extension tube 23. The heating element is arranged such that the tubular extension 23 if downwardly extended would intersect the annular heating element 30 along a circle extending through the midpoints between the outer and inner peripheral edges of the heating element 30.

The heating element 30 comprises a casing 31 made of a sheet metal and having integral inner and outer cylindrical peripheral walls and an annular bottom wall extending therebetween. The outer peripheral wall of the casing 31 is welded to the bottom ends of the stays 26. The casing 31 is generally U-shaped in vertical section and accomodates outer and inner packings 32 and 33 of moulded rubber. These packings 32 and 33 are disposed along the outer and inner peripheral walls of the casing 31 and clamped against the bottom wall of the casing 31 by means of tabs 34 and 35 which are integral with the casing 31 and bent over the packings 32 and 33, respectively.

The packings 32 and 33 are formed with radially inwardly directed radially outwardly directed grooves 36 and 37, respectively. A thin heating plate 38 of an annular sheet of aluminum has outer and inner peripheral edge portions snugly received in the grooves 36 and 37 in the packings 32 and 33, respectively. An electric conductor 39 has a terminal 40 which is welded to the annular heating plate 38. The conductor 39 extends outwardly from the intake manifold 12 through the heat insulating layer 13 to an electric switch (not shown) which is electrically connected to the plus terminal of an electric power source, such as a battery (not shown) installed on an associated motor car.

A thin and annular PTC ceramic heater 41 is secured to the underside of the annular heating plate 38 by means of an electrically conductive adhesive. The space between the ceramic heater 41 and the bottom wall of the casing 31 is filled with cushioning material 42 made of woven fine stainless steel wires. The PTC ceramic heater 41 has been made by baking and includes barium titanate as the main component of the heater. The ceramic heater 41 has a Curie temperature which varies with the amounts of lead (Pb) and manganese (Mn) contained in the ceramic and ranges from about 120° to about 150° C. When the heater 41 is electrically connected to the electric power source, the heater is very quickly heated to its Curie temperature and maintained at this temperature.

Advantageously, the electrically conductive adhesive used to adhesively secure the ceramic heater 41 to the heating plate 38 is also heat-conductive and may preferably be made from epoxy or silicone into which fine particles of silver are incorporated.

In operation, the heating element 30 will be electrically connected to the electric power source when the engine is started. The electric current passes through the conductor 39, the terminal 40, the heating plate 38, the PTC ceramic heater 41, the cushioning material 42 to the casing 31 from which the current passes through the stays 26, tubular extension 23 and intake manifold 12. The electric energy is consumed mainly at the PTC ceramic heater 41 and converted to heat. The PTC ceramic heater 41 is promptly heated to its Curie temperature. This heat is conducted to the heating plate 38.

The engine is in cold state just after the engine has been started. Thus, because the intake air flowing into the engine and the inner surface of the intake pipe 10 are both at low temperatures, the liquid fuel supplied by the fuel supply means into the intake pipe 10 upstream of the throttle valve is hardly vaporized, with a result that a large amount of liquid fuel is adhered to the inner surface of the intake pipe 10 and flows thereon in liquid phase.

When the flow of the liquid fuel on the inner surface of the intake pipe reaches the bottom end of the tubular extension 23, the fuel is dropped off the tubular extension 23 into the air flowing therethrough. A part of the dropped fuel is atomized at this time, but the rest of the fuel falls in the form of droplets which impinge upon the heated heating plate 38 of the heating element 30 and are reliably vaporized by the heat of the heating plate. The vapor of the fuel is mixed with air to form a substantially homogeneous air-fuel mixture which flows from the distribution chamber 18 through the branches 19 of the manifold into respective engine cylinders to assure substantially complete combustion in respective cylinders with resultant advantageous decrease in the emission of harmful components of the engine exhaust gases such as HC and also advantageous improvement in the engine fuel consumption rate.

When several minutes have passed from the commencement of the engine operation, the engine is warmed up to a hot condition, so that the temperatures of the intake air into the engine and of the intake pipe and manifold are increased sufficiently to facilitate the vaporization of the liquid fuel fed into the intake pipe. It will be noted that the temperature of the intake system at the inner surfaces thereof is high enough to quickly vaporize any liquid fuel which would flow on the inner surface of the intake pipe and the intake manifold. In this engine operating condition, therefore, the heating element 30 may be electrically disconnected from the battery.

In order to detect whether the engine is in cold or hot condition, a temperature detector (not shown) may be provided to measure the temperature of the engine cooling water or of the air flowing through the intake system into the engine. The hot condition of the engine may be decided by the water temperature of higher than 60° C., for example, or by the intake air temperature of higher than 30° C., for example. Because this kind of temperature detector is well known by those in the art and because the temperature detector itself is not a part of the present invention, this point will not be discussed in more detail.

In the illustrated embodiment of the invention, the heating element 30 comprises a single annular PTC ceramic heater 41. However, this is not essential for the invention and the heating element 30 may alternatively comprises a plurality of small PTC ceramic heaters which are circularly arranged and secured to the heating plate 38.

In place of the carburetor shown in FIG. 4, the intake system may be provided with a 2-stage, 2-barrel carburetor (not shown). In this alternative case, the tubular extension 23 and the heating element 30 may be disposed in the primary fuel circuit of the carburetor.

As discussed above, the fuel heating apparatus according to the present invention is advantageously operative to reliably quickly vaporize the liquid fuel flowing on the inner surface of the intake pipe so that the adverse effect which would otherwise be caused by the liquid fuel flow on the intake pipe inner surface is eliminated. In addition, the vaporization of the fuel contributes to the reduction of the emission of the harmful exhaust gas components and to the improvements in the fuel consumption rate of the engine and also in the engine response.

What is claimed is:

1. In an internal combustion engine including an intake pipe, a throttle valve provided therein, means upstream of said throttle valve for supplying liquid fuel into said intake pipe and an intake manifold for distributing a mixture of air and the fuel to respective engine cylinders, said intake manifold defining an inlet opening connected to the bottom end of said intake pipe, the improvement which comprises a fuel heating apparatus including a tubular extension member disposed substantially coaxially with said intake pipe and extending downwardly through said inlet opening into said intake manifold and having a substantially cylindrical inner peripheral surface substantially flush with the inner peripheral surface of said intake pipe, and an annular heating element disposed in said intake manifold substantially in vertical alignment with the peripheral wall of said tubular extension member and supported therefrom wherein said inlet opening in said intake manifold is substantially coaxial with said intake pipe and has an inner diameter greater than the inner diameter of said intake pipe, the part of said intake manifold below said inlet opening defining a distribution chamber from which the mixture of air and fuel is distributed through branches of said intake manifold to respective engine cylinders, said heating element including a generally annular casing disposed in said distribution chamber and spaced downwardly a distance from the bottom end of said tubular extension member, at least one stay supporting said casing from said tubular extension member, said casing having a substantially annular open top disposed beneath the bottom end of said tubular extension member so that the part of the fuel which flows in liquid phase on the inner peripheral surfaces of said intake pipe and said tubular extension member falls down therefrom into said casing, a substantially annular heating means disposed in said casing and adapted to be electrically energized to heat and vaporize the liquid part received in said casing, wherein the part of said intake manifold which defines said inlet opening has a flat top surface secured to the bottom end of said intake pipe with a heat insulating member and a gasket member being sandwiched therebetween, said flat top surface being formed with an annular recess adjacent the peripheral edge of said inlet opening, and wherein said tubular extension member has an annular flange extending radially outwardly from the upper end of said tubular extension member into said annular recess, said annular flange having a top surface substantially flush with the top surface of said intake manifold around said annular recess, wherein said heating element further includes inner and outer annular packings disposed in said casing in substantially concentric relationship with each other, said annular heating means comprising an annular heating plate of a sheet metal having inner and outer peripheral edges axially and radially supported by said inner and outer packings, an annular ceramic heater disposed in heat-conductive relationship with the underside of said heating plate and adapted to be electrically connected to an electric power source, said ceramic heater being also electrically connected to said casing.

2. A fuel heating apparatus as defined in claim 1, wherein said annular heating element has outer and inner diameters greater and smaller than the outer and inner diameters of said tubular extension member, respectively.

3. A fuel heating apparatus as defined in claim 1, wherein said heating element includes a ceramic heater which includes barium titanate.

4. A fuel heating apparatus as defined in claim 1, wherein said casing is generally U-shaped in vertical section and includes integral tabs extending from the inner and outer peripheral walls of said casing and bent over said inner and outer packings to clamp them against the bottom wall of said casing.

5. A fuel heating apparatus as defined in claim 1 or 4, wherein said heating element further includes an electric conductor having an inner end electrically connected to said heater and extending outwardly from said intake manifold through said heat insulating member, and an electrically conductive cushioning material disposed between said ceramic heater and the bottom wall of said casing.

6. A fuel heating apparatus as defined in claim 1, wherein said inner and outer packings are formed with radially outwardly and inwardly directed annular grooves, respectively, and said inner and outer peripheral edges of said heating plate are snugly received in said grooves, respectively.

7. A fuel heating apparatus as defined in claim 5, wherein said electrically conductive cushioning material is made of woven fine wires.

8. A fuel heating assembly for use with an internal combustion engine comprising fuel delivery means, an intake pipe connected to said fuel delivery means, an intake manifold operatively connected with said intake pipe to distribute an air/fuel mixture to said engine, means defining an inlet opening in said intake manifold adjacent the connection with said intake pipe, means defining a cylindrical extension disposed coaxially with said intake pipe and having an output end extending into said inlet opening means and having an internal cylindrical surface substantially flush with the internal surface of said intake pipe, an annular heating means for heating fuel supplied by said fuel delivery means, said heating means being coaxially aligned with and secured beyond the output opening of said cylindrical extension means so that said heating means is positioned within said inlet opening means, said heating means including a generally annular casing having a substantially annular open top disposed adjacent the periphery of said output end of said cylindrical extension means, concentrically mounted, inner and outer annular packings disposed in said annular casing, an annular heating plate secured between said inner and outer packings and at least one ceramic heating element secured in a heat-conducting manner beneath said annular heating plate, an electric power source and means for electrically connecting said at least one ceramic heater to said electric power source.

* * * * *